United States Patent [19]

Nakamura et al.

[11] Patent Number: 4,923,763
[45] Date of Patent: May 8, 1990

[54] PERPENDICULAR MAGNETIC RECORDING MEDIUM

[75] Inventors: Hiroki Nakamura, Kawasaki; Takashi Yamada; Yoshiaki Ouchi, both of Yokohama, all of Japan

[73] Assignee: Kabushiki Kaisha Toshiba, Kawasaki, Japan

[21] Appl. No.: 245,945

[22] Filed: Sep. 19, 1988

Related U.S. Application Data

[63] Continuation-in-part of Ser. No. 158,038, Feb. 16, 1988, abandoned, which is a continuation of Ser. No. 795,547, Nov. 6, 1985, abandoned.

[30] Foreign Application Priority Data

Nov. 14, 1984 [JP] Japan .................................. 59-238517
Jul. 23, 1985 [JP] Japan .................................. 60-161174

[51] Int. Cl.$^5$ ............................................. G11B 5/64
[52] U.S. Cl. ................................. 428/458; 427/129; 428/460; 428/473.5; 428/474.4
[58] Field of Search ............... 428/458, 460, 461, 694, 428/900, 473.5, 474.4; 427/129

[56] References Cited

U.S. PATENT DOCUMENTS

| | | | |
|---|---|---|---|
| 4,489,124 | 12/1984 | Watanabe | 427/129 |
| 4,508,782 | 4/1985 | Miura et al. | 428/694 |
| 4,533,603 | 8/1985 | Fukuda et al. | 428/694 |
| 4,568,598 | 2/1986 | Bilkadi et al. | 427/129 |
| 4,575,475 | 3/1986 | Nakayama et al. | 427/129 |
| 4,661,377 | 4/1987 | Morita et al. | 427/130 |

FOREIGN PATENT DOCUMENTS

| | | |
|---|---|---|
| 3400722 | 7/1984 | Fed. Rep. of Germany . |
| 58-45623 | 3/1983 | Japan . |
| 13071 | 1/1984 | Japan . |
| 79507 | 5/1984 | Japan . |
| 79508 | 5/1984 | Japan . |
| 59-129956 | 7/1984 | Japan . |
| 60-242513 | 12/1985 | Japan . |

OTHER PUBLICATIONS

"Patent Abstracts of Japan", vol. 7, No. 127 (P-201)[1272], Jun. 3, 1983.

Primary Examiner—Paul J. Thibodeau
Attorney, Agent, or Firm—Foley & Lardner, Schwartz, Jeffery, Schwaab, Mack, Blumenthal & Evans

[57] ABSTRACT

There are disclosed a perpendicular magnetic recording medium comprising a substrate of a polymer film containing 0.7% by weight or less of a residual solvent and a ferromagnetic alloy layer formed on the substrate and a method for preparing the same comprising the steps of heating a substrate composed of a polymer film containing a residual solvent in order to regulate a content of the solvent existing in the substrate to 0.7% by weight or less; and afterward forming a magnetic layer composed of a ferromagnetic alloy on the substrate.

The perpendicular magnetic recording medium of the present invention has a prolonged durability and heightened reliability.

13 Claims, 2 Drawing Sheets

Heating time (min)

PERPENDICULAR MAGNETIC RECORDING MEDIUM

The application is a continuation-in-part of application Ser. No. 158,038, filed Feb. 16, 1988, now abandoned, which is a continuation of application Ser. No. 795,547, filed Nov. 6, 1985, now abandoned.

BACKGROUND OF THE INVENTION

This invention relates to a perpendicular magnetic recording medium in which a ferromagnetic alloy layer is formed on a polymer film substrate, and to a method for preparing the same. More specifically, it relates to a perpendicular magnetic recording medium having prolonged durability and heightened reliability and a method for preparing the same.

In recent years, much attention has been paid to a perpendicular magnetic recording system for carrying out high-density recording by the utilization of remnant magnetization in a direction perpendicular to the surface of a magnetic recording medium.

As a typical example of the perpendicular magnetic recording medium for perpendicular magnetic recording, there is known a medium which permits forming a Co-Cr system alloy layer having an axis of easy magnetization in the direction perpendicular to the surface thereof by means of a sputtering process to form a magnetic layer (see, for example, Japanese Provisional Patent Publication No. 122232/1980).

One example of the perpendicular magnetic recording media will be described in reference to FIG. 2 of accompanying drawings. On at least one side of a substrate 1 comprising a heat-resistant polymeric film of a polyimide, a polyethylene terephthalate, an aromatic polyamide or the like, a magnetic layer 2 is formed which is composed of a Co-Cr system alloy layer or the like. Further, on this magnetic layer 2, a protective layer 3 and a lubricating layer 4 are provided in turn in order to complete the perpendicular recording medium. This type of perpendicular recording medium is applied to magnetic tapes and floppy disks.

The above-mentioned Co-Cr system alloy layer which is the magnetic layer may be formed on the substrate by a conventional sputtering process or a magnetron sputtering process in an argon atmosphere. The thus formed Co-Cr system alloy layer takes a column-like constitution oriented along the C-axis, and has a great saturation magnetization Ms which depends upon the composition of the Co-Cr system alloy layer, the high magnetic anisotropy energy Ku perpendicular to the surface of the layer and the large coercive force $H_{C\perp}$, in a direction perpendicular to the surface of the layer, which magnetic properties are conditions for permitting the high-density recording.

However, in the case of forming the Co-Cr system alloy layer having desired magnetic properties in accordance with the above-mentioned producing method, it is required to heat the polymer film as the substrate at 80° C. to 200° C. in vacuum. Thus, a polyimide film and an aromatic polyamide film are preferred, since they are easier to prepare than a polyester film and have no problems such as deposition of oligomers on the film surface and the like.

However, in films such as the polyimide film and the aromatic polyamide film which are manufactured by a flow casting process and are required to be heated to remove a used solvent, there is a problem that some solvent still remains.

Concrete examples of the organic solvents include N,N'-dimethylacetamide, dimethyl sulfoxide, hexamethylphosphorylamide, N,N'-dimethylformamide, N-methyl-2-pyrrolidone, tetramethylurea, tetramethylenesulfone, phenol, phenol monohalide, cresol, cresol monohalide and xylene.

According to the above, when the polyimide film or the aromatic polyamide film having excellent heat resistance is heated in vacuum chamber as the substrate to prepare the ferromagnetic alloy layer, the solvent contained in the film will leak out on the surface of the substrate disadvantageously, with the result that the adhesive strength of the ferromagnetic alloy layer to the substrate will deteriorate. According to a running test on a track through a magnetic head, it has been found that the above-mentioned deterioration of the adhesive strength will facilitate the peeling of the ferromagnetic alloy layer from the substrate, which fact is considered to be fatal problem from the viewpoints of durability and reliability of the perpendicular magnetic recording medium.

The problem described above cannot be solved by such a usual surface treatment as a heat degassing treatment which may be carried out as a pretreatment for a sputtering process or vacuum evaporation.

For example, Japanese Provisional Patent Publication No. 129956/1984 discloses that an acrylic resin substrate for a magneto-optical recording medium is thermally treated under $10^{-4}$ Torr or less at 70° to 85° C. for 1 hour or more in order to degas the surface of the acrylic resin substrate and to thereby improve magnetic properties of the magnetic layer which will be formed on the substrate. However, the magneto-optical recording medium is used without contacting with the optical head, whereby the above-mentioned perpendicular magnetic recording medium is used in contact with the magnetic head. Thus in the case of this magneto-optical recording medium, the adhesive strength between the substrate and the magnetic layer is not as important.

On the other hand, when the residual solvent in the polyimide film is mainly N,N'-dimethylacetamide (boiling point: 165° C. at 760 mmHg, 63° C. at 12 mmHg), the amount of the residual solvent in the whole film will not change, even if the degassing treatment is carried out under $10^{-4}$ Torr or less at 100° C. for about 1 hour. For this reason, the adhesive strength of the ferromagnetic alloy layer will not be improved and circular peeled portions between the substrate film and the magnetic layer will not be reduced in. A peeling phenomenon will occur during operation of the magnetic head probably due to the residual solvent in the film. The reason why the solvent is not removed from the film would be that the residual solvent interacts with molecules of the polymer and thus is difficult to vaporize from the film. In fact, in the case of the above-mentioned solvents, it has been shown from test results using a thermogravimetry device in the atmosphere that a weight change of the sample film due to the decrease of the residual solvent cannot be observed at a temperature less than 260° C.

Further, it is important to reduce the amount of the residual solvent not only on the surface of the film but also in the whole film, because the solvent in the film will bring about, in addition to the formation of the circular peeled portions during running caused by the magnetic head, the deterioration of adhesive strength owing to thermal diffusion of the residual solvent from the interior of the film to a boundary surface between the film and the ferromagnetic alloy layer.

SUMMARY OF THE INVENTION

An object of the present invention is to provide a perpendicular magnetic recording medium having a prolonged durability and a heightened reliability and a method for preparing the same.

That is, a perpendicular magnetic recording medium of this invention comprises a ferromagnetic alloy layer is formed on the surface of a polymer film substrate in which a residual solvent is present in an amount of 0.7% by weight or less.

A method for preparing a perpendicular magnetic recording medium comprises the steps of heating a polymer film substrate so as to reduce a content of a residual solvent present in the substrate to 0.7% by weight or less and forming a ferromagnetic alloy layer on the substrate.

DESCRIPTION OF THE PREFERRED EMBODIMENTS

Figure 1:
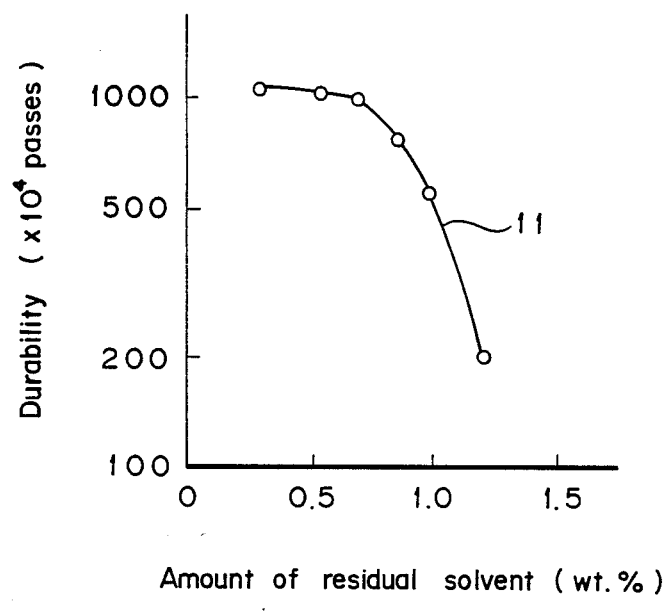
FIG. 1 is a graph showing a relation between a content of a residual solvent in a film of a perpendicular magnetic recording medium according to this invention and the number of rotations (passes) of the medium before either of the medium or the head suffers a conspicuous damage.

In this invention, the content of a residual solvent means an amount of the solvent contained in a polymer film substrate with respect to the total amount of the substrate. Measuring methods for the residual solvent in the film include a gas chromatography method, a solvent extraction method and a thermogravimetry method, but in this invention, the thermogravimetry method was employed. The measurement of the residual solvent was accomplished on the bases of weight changes resulting from the evaporation of the residual solvent. In the measurement a small piece of the polymer film, e.g. about 20 mg, is used. The conditions of its measurement are the following: (1) The rate of temperature increase is 10° C./min., (2) the atmosphere is open air, and (3) the range of measuring temperature is from room temperature to about 500° C. Firstly, the film shows a weight change owing to evaporation of water at the neighbor of 100° C. Secondly, the weight change due to evaporation of the residual solvent is observed. Finally, the dramatic weight reduction caused by the decomposition of the polymer film occurs at an even higher temperature. Therefore, the amount of the residual solvent is the difference between a weight at the time when a weight change does not occur any more after evaporation of water and a weight at the time when a weight change does not occur any more, which is before the decomposition of the film. The latter state is regarded as having a content of residual solvent of 0. That is, the weight difference is the content of a residual solvent in the substrate. For example, the decomposition temperature of the polyimide film is 450° C., and weight change of N,N'-dimethylacetamide contained therein begins at around 260° to 270° C. and ceases at around 350° to 360° C. Thus, the weight change (difference) may be obtained by measuring the weights of the substrate before the beginning temperature of the above weight change and after the cease temperature of the weight change.

The polymer film to be used in this invention may be any material, so long as it has heat resistance, and examples of such polymer films include a polyimide film, an aromatic polyamide film, a polyamidimide film, a polyparabanic acid film a polyoxazole film and the like. A preferable thickness of the polymer film is 5 $\mu$m to 100 $\mu$m.

In this invention, as a ferromagnetic alloy used for a ferromagnetic alloy layer which will be formed on the surface of the substrate, any alloy may be employed, so long as it is usually known as a medium for perpendicular magnetic recording. Examples of such alloys include ferromagnetic alloys such as Co-Cr, Co-Cr-Rh, Co-Ru, Co-CoO, Fe-Cr and the like. A thickness of ferromagnetic alloy layer is preferably selected from 0.1 $\mu$m to 1 $\mu$m.

This invention requires that the residual solvent in the polymer film substrate must be in an amount of 0.7% by weight or less. If film containing the less than 0.7% by weight of solvent is not directly available, it is essential to carry out a heat pretreatment of the film in the atmosphere or in vacuum chamber prior to forming the ferromagnetic alloy layer thereon in order to regulate the content of the residual solvent to a level of 0.7% by weight or less preferably 0.1 to 0.7%, more preferably 0.3 to 0.7%.

When the content of the residual solvent is in excess of the level of 0.7% by weight, the adhesive strength of the ferromagnetic alloy layer to the substrate will be low and the resulting perpendicular magnetic recording medium will have poor durability.

As the organic solvent to be used in the present invention, there may be mentioned, for example, N,N'-dimethylacetamide, dimethyl sulfoxide, hexamethylphosphorylamide, N,N'-dimethylformamide, N-methyl-2-pyrrolidone, tetramethylurea, tetramethylenesulfone, phenol, phenol monohalide, cresol, cresol monohalide and xylene.

Now, reference will be made to an example of heat treatment conditions for decreasing the amount of the solvent present in the polymer film substrate. The decision of what heat treatment condition to use can be effectively determined by measuring a weight change due to the evaporation of the solvent by means of a thermogravimetry device particularly in the case of the treatment in the atmosphere. Needless to say, a treating temperature should be selected in compliance with the kind of existing solvent. A treatment time may be decided by first setting a treatment temperature at a level higher than a temperature at which the beginning of a weight change is perceived by a thermogravimetry measurement and then measuring the amount of the residual solvent with time. When the heat treatment is accomplished in a vacuum chamber, the treatment temperature may naturally be lower than the above. For example, in the case that N,N'-dimethylacetamide is the main solvent remaining in the polyimide film, measurement results of the thermogravimetry have indicated that the weight change of the film begins at about 260° C. at a temperature rise rate of 15° C. per minutes and ceases at about 360° C. On the basis of these results, experiments have been carried out under various conditions to establish a treatment method of this invention.

For example, in the case of a polyimide film, it is preferable to heat the same at 260° C. or more in the atmosphere, and it is preferred to heat the same at 220° C. or more in a vacuum of $10^{-5}$ Torr or lower. It is to be noted that the upper limit of the heat temperature is subject to restriction due to a decomposition temperature of the polymer film. For example, in the case of the polyimide film, the upper limit of the heat temperature is substantially set at around at 380° C. since the decomposition temperature of polyimide is about 450° C. Furthermore, in the case where the polyimide films have a glass transition point in the range from 280° C. to 350° C., it is considered that the evaporation of residual solvent may easily occur at higher temperature than the glass transition points. Generally, the heat treatment for reducing the residual solvent in the polymer film substrate may be practically accomplished in the atmosphere, because facilities for the heat treatment can be easily constructed.

EXAMPLES

Now, reference will be made to experiments which have led this invention to completion.

Example 1

On polyimide film substrates having different contents of a residual solvent, 5,000-Å-thick Co-Cr film as ferromagnetic alloy layers were formed by means of a sputtering process in an argon atmosphere, and adhesive strengths of the Co-Cr thin film to the substrates were evaluated.

The preparation of the polyimide films was carried out by flow casting, on a steel belt, a polyamide acid solution which had been prepared by polymerizing a tetracarboxylic acid dianhydride and an aromatic diamine in the presence of a polar solvent such as N,N'-dimethylacetamide, and then carrying out a heat treatment thereby causing imidization thereof simultaneously with solvent removal.

In this case, conditions for the formation of the Co-Cr thin film were kept constant and the used polyimide films were identical in thickness and surface properties, but only the contents of the residual solvent were varied. For perpendicular magnetic recording media prepared under these conditions, adhesive strengths between the Co-Cr thin film and the polyimide films were evaluated in the following manner. Namely, an adhesive tape having an adhesive strength of 6 kg/cm² was uniformly applied to the surface of each Co-Cr thin film on which notches (crosscut) had been formed in the form of lattice, and the tape was then peeled at a constant rate and in a certain direction. Afterward, a relative adhesive strength was evaluated by calculating the area of the still existing Co-Cr thin film on the polyimide film.

In consequence, with regard to the polyimide films in which the content of the residual solvent was 0.7% by weight or less, the Co-Cr thin film thereon was not peeled, but on the polyimide films containing 1.0% by weight or more of the solvent, about 30 to about 80% of the Co-Cr thin films were peeled off. From these results, it was found that when the content of the residual solvent was in excess of a level of 0.7% by weight, the relative adhesive strength of the Co-Cr thin film would decrease noticeably.

Next, the durability of the perpendicular magnetic recording media was investigated. The durability was thought to be related with the adhesive strength of the Co-Cr thin film to the polyimide film. The durability evaluation was carried out as follows. An $Al_2O_3$ protective layer having a thickness of 200 Å was formed on each Co-Cr layer, and a fluorocarbon lubricating layer was further applied onto the protective layer. Actually, the durability experiment was carried out by forming the magnetic recording medium into the shape of a floppy disk, and by contacting a ferrite magnetic head at the same track on the disk, as well as holding down the magnetic head onto the disk by means of a pad, while rotating the disk at a speed of 300 rotations per minute. The load on the pad was 15 g. The durability is defined here as the number of rotations (passes) of the disk before either of the medium (disk) or the head suffers a conspicuous damage. What is meant by a conspicuous damage, in the case of the medium, is a state in which the Co-Cr layer is peeled off and the surface of the film substrate is exposed. In FIG. 1, results of the durability relative to the content of the residual solvent in the polyimide films are represented by a curve 11. Each measurement result plotted in this drawing is an average value of each group of 10 samples. The tendency of this curve 11 closely corresponds to results of the adhesive strength test.

The curve 11 in FIG. 1 indicates that the Co-Cr thin film tens to locally peel off more easily on the polyimide film having a high content of the solvent, and thus an increased rate of its dropout is liable to be accelerated.

Example 2

Polyimide films having a thickness of 75 μm and containing 0.3% by weight and 1.26% by weight of a solvent were prepared by a flow casting process.

Figure 3:
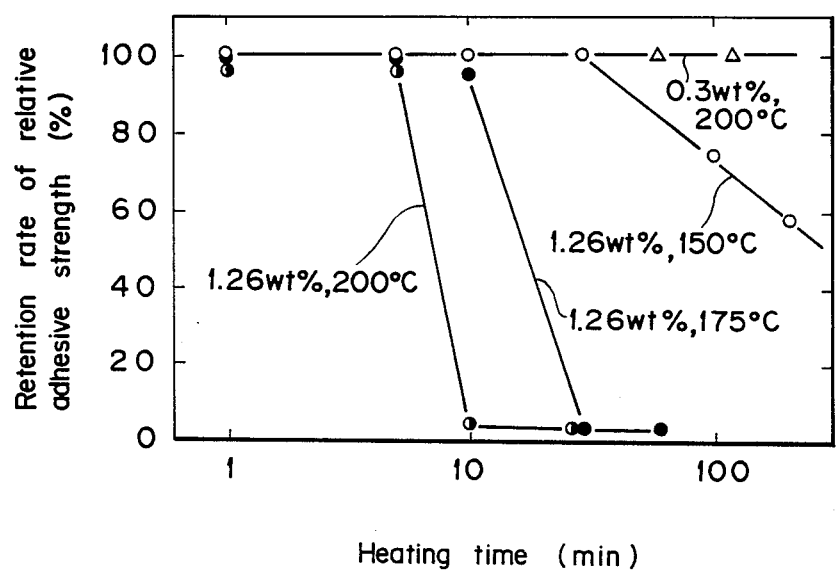
FIG. 3 is a graph showing the change of a relative adhesive strength retention rate of a Co-Cr thin film owing to a heat treatment.

Subsequently, these polyimide films were subjected to a heat treatment at each temperature of 150° C., 175° C. and 200° C. in the atmosphere by varying the treatment time in order to determine the deterioration of adhesive strength due to thermal diffusion of the solvent from the interior of each film substrate to a boundary between the substrate and the Co-Cr thin film. The results are shown in FIG. 3. This inquiry is important to determine the influence of the thermal diffusion of the solvent on the adhesive strength between the film and the Co-Cr thin film, the aforesaid thermal diffusion occurring along with a temperature rise at the time of the formation of the protective layer. It is important to know to what extent the adhesive strength of the Co-Cr thin film can be maintained upon heat treatment since it is preferred to elevate the temperature of the substrate from the viewpoint of improvement in the thin film quality at the time of forming the protective layer. FIG. 3 shows retention rates of the relative adhesive strengths of the Co-Cr thin films which were formed on the polyimide films containing the solvent in amounts of 0.3% by weight and 1.26% by weight and which were subjected to a heat treatment at the respective temperatures for certain times. Here, the retention rate of the relative adhesive strength means a percent of a retaining relative adhesive strength after heat treatment calculated by regarding a relative adhesive strength before the heat treatment as a value of 100%. With regard to the film substrate the residual solvent content of which was 0.3% by weight, relative adhesive strength was not changed even after 2 hours' heating treatment. However, film substrates having a the solvent content which was 1.26% by weight brought about a noticeable drop in the relative adhesive strength in 50 minutes or more at a temperature of 150° C., in 10 minutes or more at 175° C., and in 7 minutes or more at 200° C. These results would occurred because the solvent diffused up to the boundary between the film and the Co-Cr thin film formed a thin layer which led to the additional deterioration of the adhesive strength.

It has been confirmed from the above-mentioned results that when a ferromagnetic alloy layer such as the Co-Cr thin film is formed on the polymer film substrate by means of the sputtering process to prepare a magnetic medium, the content of the residual solvent in the polymer film substrate to be used is required to be 0.7% by weight or less, and that if such a requirement is satisfied, the durability of the perpendicular magnetic recording medium can be prolonged dramatically.

Example 3

Figure 2:
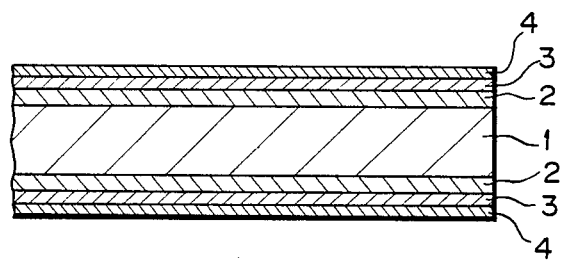
FIG. 2 is a sectional view of the perpendicular magnetic recording medium.

A polyimide film containing 1.3% by weight of a remaining solvent and having a thickness of 75 μm was thermally treated at 320° C. for 1 hour in the atmosphere. As a result, a content of the residual solvent in the film was 0.3% by weight. As shown in FIG. 2, this polyimide film was employed as a substrate 1, and 0.5 μm-thick Co-Cr alloy layers 2 which were magnetic layers were formed on the opposite sides of the substrate 1 by means of a direct current magnetron sputtering. On both of the magnetic layers 2, protective layers 3 having a thickness of 200 Å and comprising $Al_2O_3$ were formed by a sputtering process, and lubricating layers 4 of fluorocarbon having a thickness of 200 Å or less were formed on both the protective layers 3 by means of a spin coating method in order to prepare a perpendicular magnetic recording medium.

As a result of a durability test, it was found that the thus prepared perpendicular magnetic recording medium withstood ten million or more passes through a magnetic head.

Example 4

A polyimide film containing 1.3% by weight of a residual solvent and having a thickness of 75 μm was subjected to a heat treatment at a vacuum degree of $10^{-5}$ Torr at 250° C. for 30 minutes. The content of the residual solvent in the thus treated film was 0.3% by weight as in the preceding example. From this film, a perpendicular magnetic recording medium was prepared in the same manner as in the above-mentioned example. The thus prepared perpendicular magnetic recording medium withstood ten million or more passes through a magnetic head.

Example 5

An aromatic polyamide film containing 2% by weight of a residual solvent and having a thickness of 50 μm was subjected to a heat treatment at 300° C. for 20 minutes in the atmosphere. A content of the residual solvent in the thus treated film was 0.5% by weight. From this film, a perpendicular magnetic recording medium was prepared in the same manner as in the preceding example. The thus prepared perpendicular magnetic recording medium also withstood ten million or more passes through a magnetic head.

In the aforesaid examples, reference has been made to the ferromagnetic alloy layer having the Co-Cr single layer, but this invention is not limited to such an alloy layer constitution. For example, this invention can also employ the ferromagnetic alloy layer in which the Co-Cr thin film is lined with a soft magnetic layer such as a permalloy composed mainly of an Fe-Ni alloy. In addition to the Co-Cr alloy layer above, there may be directly applied, in this invention, other ferromagnetic alloy layers composed mainly of a Co-based alloy formed by a sputtering process or a vacuum evaporation.

Example 6

A polyimide film containing 1.3% by weight of a residual solvent and having a thickness of 75 μm was thermally treated at 320° C. for 3 hours in an atmosphere. As a result, the content of the residual solvent in the thus treated film was 0.1% by weight. As shown in FIG. 2, this polyimide film was employed as a substrate 1, and Co-Cr alloy layers 2 with thicknesses of 0.5 μm which were magnetic layers were formed on the opposite sides of the substrate 1 by means of a direct current magnetron sputtering. On both of the magnetic layers 2, protective layer 3 having a thickness of 200 Å and comprising $Al_2O_3$ were formed by a sputtering process, and lubricating layers 4 of fluorocarbon having a thickness of 200 Å or less were formed on both the protective layers 3 by means of a spin coating method in order to prepare a perpendicular magnetic recording medium.

As a result of a durability test, it was found that the thus prepared perpendicular magnetic recording medium withstood ten million or more passes through a magnetic head.

As described above, according to this invention, the content of the residual solvent in the polymer film is regulated to a level of 0.7% by weight or less, particularly 0.1 to 0.7% whereby the adhesive strength of the magnetic layer can be heightened, with the result that the perpendicular magnetic recording medium has a prolonged durability and an enhanced reliability.

We claim:

1. A perpendicular magnetic recording medium which comprises a substrate of a polymer film selected from the group consisting of a polyimide film, an aromatic polyamide film, a polyamidimide film, a polyparabanic acid film and a polyoxazole film containing 0.1 to 0.7% by weight of a residual solvent selected from the group consisting of N,N'-dimethylacetamide, N,N'-dimethylformamide, dimethyl sulfoxide, hexamethylphosphorylamide, N-methyl-2-pyrrolidone, tetramethylurea, tetramethylenesulfone, phenol, phenol monohalide cresol, cresol monohalide and xylene and a ferromagnetic alloy layer formed on said substrate.

2. A perpendicular magnetic recording medium according to claim 1, wherein said ferromagnetic alloy is an alloy selected from the group consisting of Co-Cr, Co-Cr-Rh, Co-Ru, Co-CoO and Fe-Cr.

3. A perpendicular magnetic recording medium according to claim 1, wherein the polymer film is polyimide.

4. A perpendicular magnetic recording medium according to claim 3, wherein the residual solvent is an organic solvent selected from the group consisting of N,N'-dimethylacetamide, N,N'-dimethylformamide and dimethyl sulfoxide.

5. A perpendicular magnetic recording medium according to claim 3, wherein the residual solvent is N,N'-dimethylacetamide.

6. A perpendicular magnetic recording medium according to claim 3, wherein the residual solvent is N,N'-dimethylformamide.

7. A perpendicular magnetic recording medium according to claim 3, wherein the residual solvent is dimethyl sulfoxide.

8. A perpendicular magnetic recording medium according to claim 1, wherein the polymer film is polyimide or aromatic polyimide.

9. A perpendicular magnetic recording medium according to claim 1, wherein the residual solvent is an organic solvent selected from the group consisting of N,N'-dimethylacetamide, N,N'-dimethylformamide and dimethyl sulfoxide.

10. A perpendicular magnetic recording medium according to claim 8, wherein the residual solvent is an organic solvent selected from the group consisting of N,N'-dimethylacetamide, N,N'-dimethylformamide and dimethyl sulfoxide.

11. A perpendicular magnetic recording medium according to claim 8, wherein the residual solvent is N,N'-dimethylacetamide.

12. A perpendicular magnetic recording medium according to claim 8, wherein the residual solvent is N,N'-dimethylformamide.

13. A perpendicular magnetic recording medium according to claim 8, wherein the residual solvent is dimethyl sulfoxide.

* * * * *